United States Patent
Lee (10) Patent No.: US 10,412,787 B2
(45) Date of Patent: Sep. 10, 2019

(54) COOKING APPLIANCE

(71) Applicants: GUANGDONG MIDEA KITCHEN APPLIANCES MANUFACTURING CO., LTD., Guangdong (CN); MIDEA GROUP CO., LTD., Guangdong (CN)

(72) Inventor: Dong heon Lee, Guangdong (CN)

(73) Assignees: GUANGDONG MIDEA KITCHEN APPLIANCES MANUFACTURING CO., LTD., Guangdong (CN); MIDEA GROUP CO., LTD., Guangdong (CN)

( * ) Notice: Subject to any disclaimer, the term of this patent is extended or adjusted under 35 U.S.C. 154(b) by 158 days.

(21) Appl. No.: 15/598,461

(22) Filed: May 18, 2017

(65) Prior Publication Data

US 2018/0184836 A1 Jul. 5, 2018

(30) Foreign Application Priority Data

Dec. 29, 2016 (CN) .................... 2016 2 1461405 U (51) Int. Cl.
    *H05B 3/68* (2006.01)
    *F24C 15/14* (2006.01)
    *A47J 36/08* (2006.01)

(52) U.S. Cl.
    CPC ............... *H05B 3/68* (2013.01); *A47J 36/08* (2013.01); *F24C 15/14* (2013.01)

(58) Field of Classification Search
    CPC ...... A47J 27/002; A47J 37/0611; A47J 36/16; A47J 36/08; H05B 3/68; F24C 15/14
    USPC .... 99/347, 444, 446, 425; 126/381.1, 382.1, 126/384.1
    See application file for complete search history.

(56) References Cited

U.S. PATENT DOCUMENTS

| | | | | |
|---|---|---|---|---|
| 4,759,342 A * | 7/1988 | Lee | ......................... | A47J 27/04 126/381.1 |
| 5,584,234 A * | 12/1996 | Baillieul | ................. | A47J 36/38 126/299 D |
| 5,848,567 A * | 12/1998 | Chiang | .................... | A47J 37/06 99/375 |
| 5,996,477 A * | 12/1999 | Bois | ..................... | A47J 37/1209 126/299 D |
| 6,062,130 A * | 5/2000 | Brady | .................. | A47J 37/0611 219/386 |
| 6,237,472 B1 * | 5/2001 | Gates | .................. | A47J 37/0786 126/25 R |

(Continued)

*Primary Examiner* — Patrick F Brinson
(74) *Attorney, Agent, or Firm* — Scully Scott Murphy & Presser (57) ABSTRACT

The present invention provides a cooking appliance, comprising a base and an upper cover articulated with the base, wherein the base comprises a back plate, the back plate is provided with a water retaining surface, and when the upper cover is opened, the water retaining surface is located between the upper cover and the base; and the cooking appliance further comprises a water container, which can be detachably installed on the water retaining surface. In this solution, the cooking appliance is additionally provided with the water container, which is detachably installed on the water retaining surface, the upper cover is opened after the cooking appliance finishes cooking, condensed water mixed with food residue or soup flows onto the water retaining surface from the upper cover and then flows into the water container along the water retaining surface.

15 Claims, 6 Drawing Sheets

(56) References Cited

U.S. PATENT DOCUMENTS

| | | | | |
|---|---|---|---|---|
| 6,389,959 B1* | 5/2002 | Robertson | A47J 37/0611 | 219/386 |
| 6,433,312 B1* | 8/2002 | Chen | A47J 37/0611 | 219/386 |
| 6,463,924 B1* | 10/2002 | Osterman | A47J 37/0786 | 126/25 R |
| 6,484,624 B1* | 11/2002 | Wu | A47J 37/0611 | 99/339 |
| 8,759,728 B2* | 6/2014 | Tassan-Mangina | H05B 6/6482 | 219/680 |
| 2004/0250809 A1* | 12/2004 | Wolf | A47J 37/0786 | 126/41 R |
| 2008/0105136 A1* | 5/2008 | McFadden | A21B 1/245 | 99/339 |

\* cited by examiner

COOKING APPLIANCE

FIELD OF THE INVENTION

The present invention relates to the field of household appliances, and more particularly, relates to a cooking appliance.

BACKGROUND OF THE INVENTION

Figure 1:
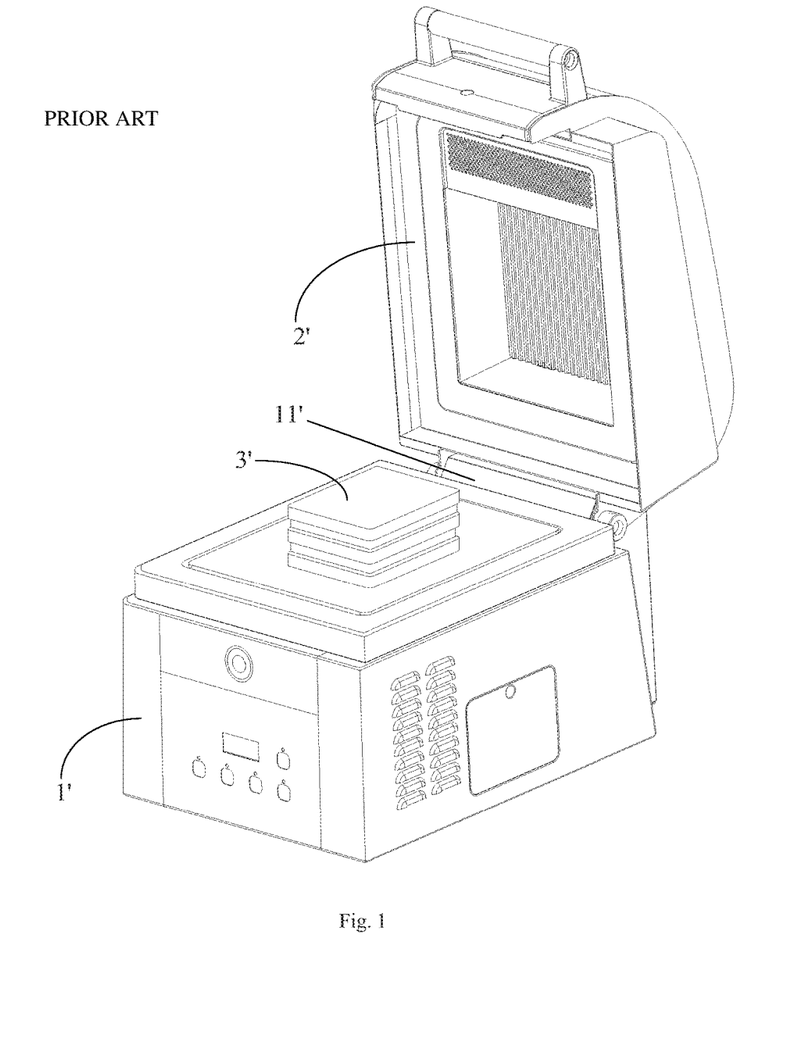
FIG. 1 is a structural schematic diagram of a cooking appliance in the prior art.
Figure 2:
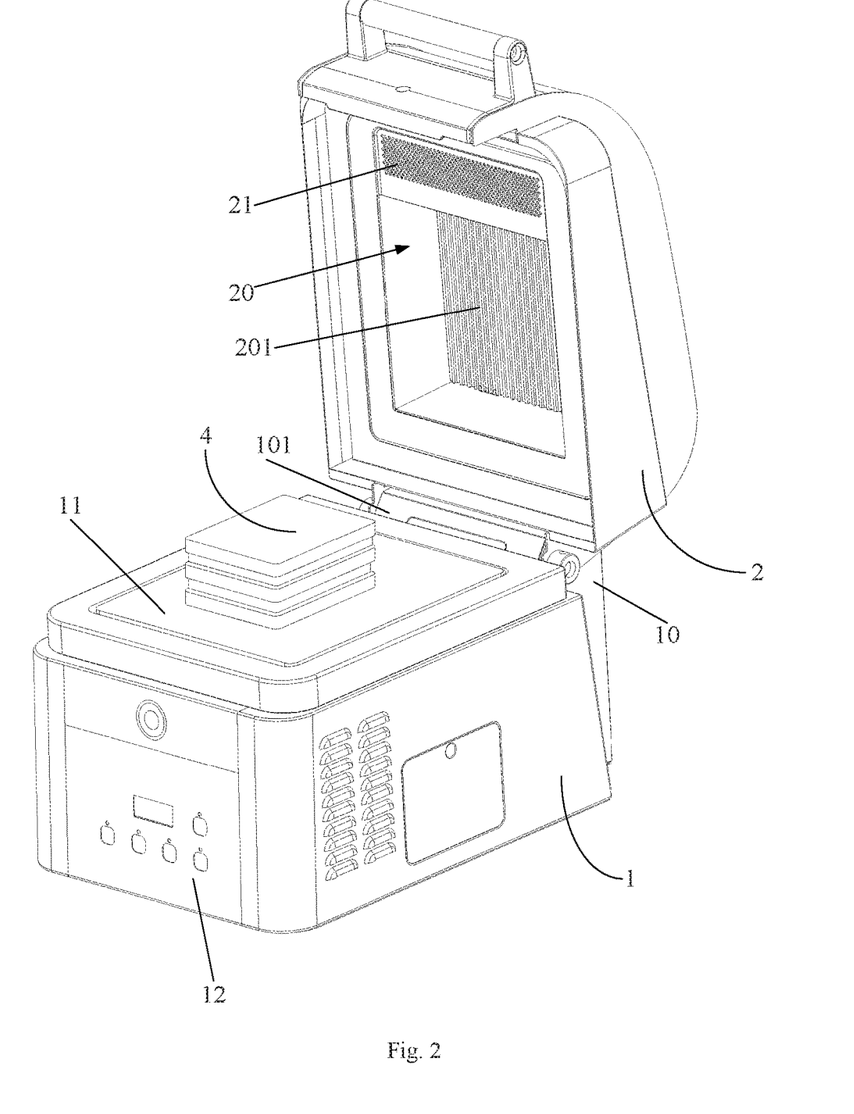
FIG. 2 is a structural schematic diagram of a cooking appliance provided by one embodiment of the present invention.
Figure 3:
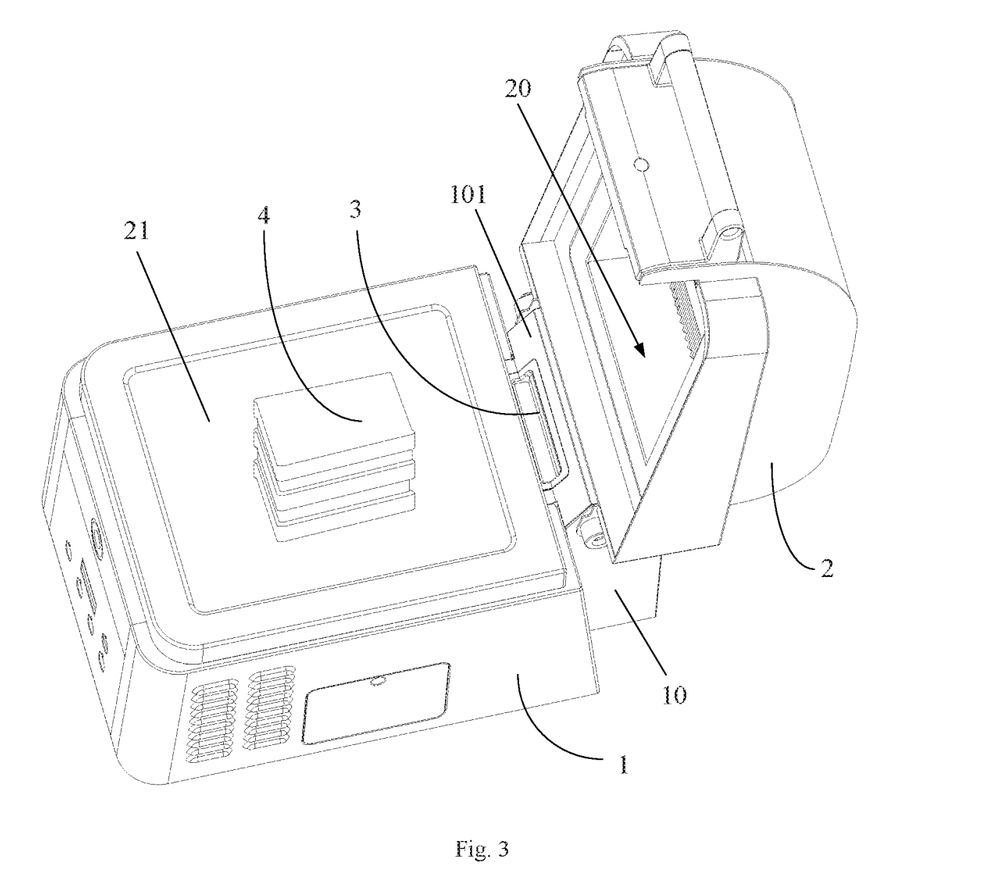
FIG. 3 is a structural schematic diagram of the cooking appliance shown in FIG. 2 at another angle.
Figure 4:
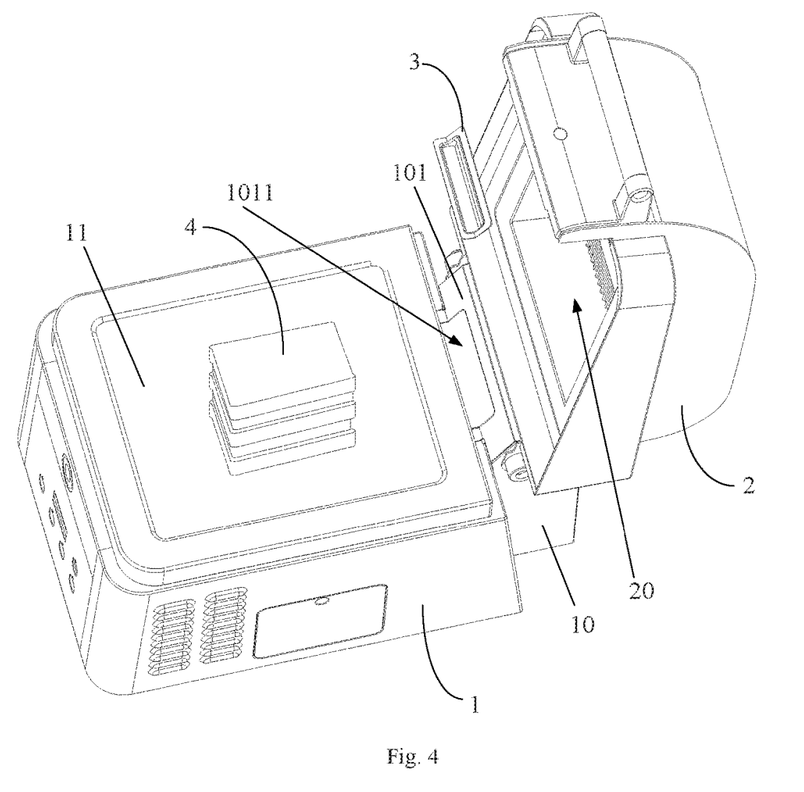
FIG. 4 is a schematic diagram of an assembly structure of the water storage trough and the cooking appliance shown in FIG. 3.
Figure 5:
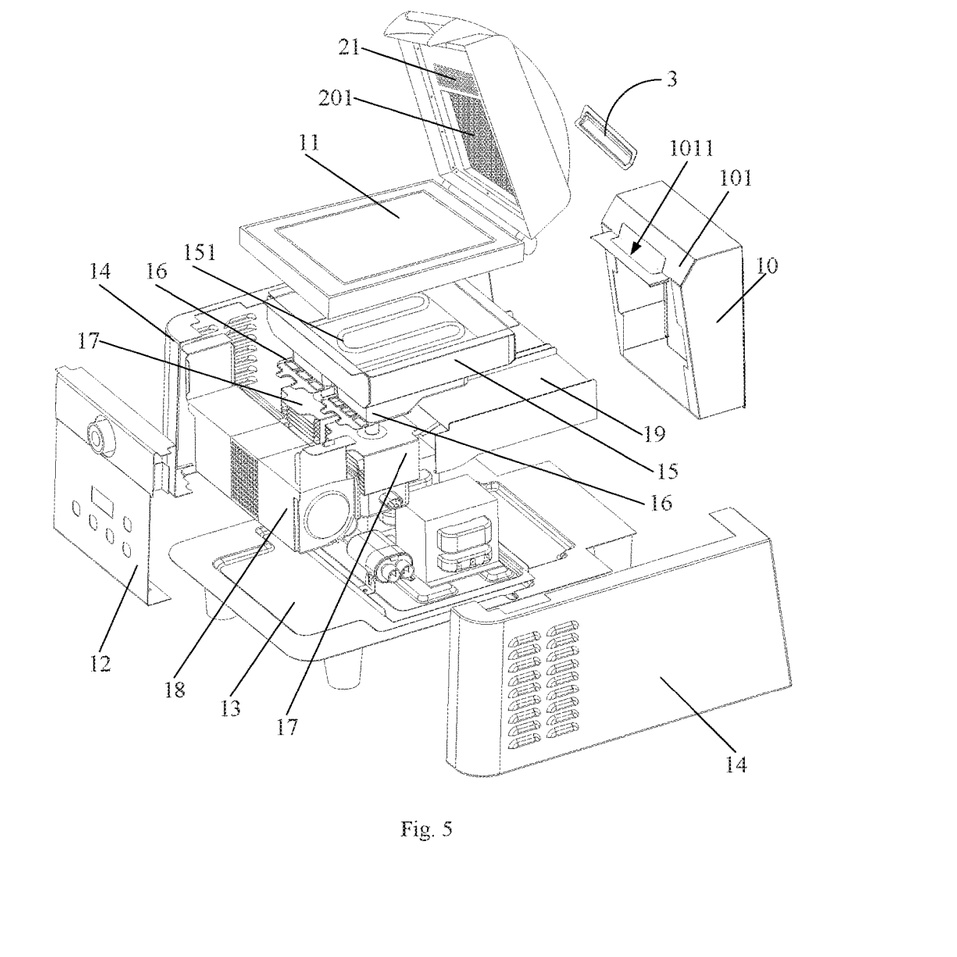
FIG. 5 is an exploded view of the cooking appliance shown in FIG. 2.

At present, some cooking appliances adopt a flip structure, as shown in FIG. 1, an upper cover 2' of a cooking appliance is articulated with a base 1', water vapor is generated when the product heats food 3', part of the water vapor is condensed in the upper cover 2', some food residue or soup may splash onto the upper cover 2' in the heating process and flow down together with the condensed water when the cover is opened, a back plate on the back of the base 1' is provided with a water retaining slope 11' in most products in order to prevent the condensed water from directly dropping to contaminate a table or other furniture, the condensed water mixed with the food residue or soup may flow onto the water retaining slope 11' between the upper cover 2' and the base 1' after the upper cover 2' is opened, in this case, the problem that the condensed water drops to contaminate the furniture can be solved, but the condensed water mixed with the food residue or soup is gathered at the bottom position of the water retaining slope 11', this position between the upper cover 2' and the base 1' is unlikely to clean, and if the food residue or soup is not cleaned, bacteria and peculiar smell are produced after a period of time, so that serious sanitation problem is caused to influence the use of the product.

SUMMARY OF THE INVENTION

The present invention intends to solve at least one of the technical problems in the prior art.

Thus, the object of the present invention is to provide a cooking appliance.

To fulfill the above object, the embodiment of the present invention provides a cooking appliance, including a base and an upper cover articulated with the base, wherein the base includes a back plate, the back plate is provided with a water retaining surface, and when the upper cover is opened, the water retaining surface is located between the upper cover and the base; and the cooking appliance further includes a water container, which can be detachably installed on the water retaining surface.

In this solution, the cooking appliance is additionally provided with the water container, which is detachably installed on the water retaining surface, the upper cover is opened after the cooking appliance finishes cooking, condensed water mixed with food residue or soup flows onto the water retaining surface from the upper cover and then flows into the water container along the water retaining surface, a user can detach the water container from the water retaining surface for cleaning and put the water container back to the water retaining surface after cleaning, and such design can reduce the cleaning difficulty of the product, so that the food residue or soup is cleaned thoroughly, and the cleanliness of the product is guaranteed to prevent the sanitation problem caused by the food residue or soup.

In the above technical solution, preferably, the water container is a water storage trough, the water retaining surface is provided with an installing hole, and the water container can be detachably installed in the installing hole.

In this solution, the water container is a water storage trough, and thus is simple in structure and low in production cost. The water retaining surface is provided with an installing hole matched with the water storage trough, so that the water storage trough is convenient to detach and install, and based on this, some fixing structures may also be arranged between the water storage trough and the installing hole to improve the fixing effect on the water storage trough, e.g., an elastic buckle is arranged on one of the water storage trough and the installing hole, and a matched clamping portion is arranged on the other one.

In any of the above technical solutions, preferably, the water retaining surface includes a diversion slope and a horizontal plane connected to the bottom of the diversion slope, the installing hole is located in the diversion slope and the horizontal plane, and the water storage trough includes a tilting portion matched with the diversion slope and a horizontal portion matched with the horizontal plane.

In any of the above technical solutions, preferably, a turned edge extending outward is formed at the top of the water storage trough, and contacts the edge of the installing hole, so that the water storage trough is installed in the installing hole.

In this solution, the turned edge is formed at the top of the water storage trough and lapped with the edge of the installing hole, and the detachment and installation of the water storage trough in such assembly mode are simple and short in time, so that the user satisfaction can be improved.

In any of the above technical solutions, preferably, the edge of the installing hole is sunken down to form an installing groove matched with the turned edge.

When the water storage trough is installed into the installing groove, the side wall of the turned edge contacts the side wall of the installing groove, so that the fixing effect on the water storage trough can be improved.

In any of the above technical solutions, preferably, the depth of the installing groove is greater than or equal to the thickness of the turned edge.

Such design ensures that after the water storage trough is installed into the installing groove, the turned edge is not higher than the outer edge of the installing groove, and the turned edge does not block condensed water, thus ensuring that the condensed water mixed with food residue or soup can completely flow into the water storage trough along the water retaining surface after flowing onto the water retaining surface.

In any of the above technical solutions, preferably, a carrier plate for placing food is arranged on the base, a first heating device is installed below the carrier plate, and the upper cover is provided with an upward sunken accommodating groove opposite to the carrier plate.

In any of the above technical solutions, preferably, a second heating device is arranged on the wall of the accommodating groove.

In any of the above technical solutions, preferably, the second heating device arranged on the wall of the accommodating groove can improve the heating efficiency, shorten the time for heating food and simultaneously improve the heating uniformity.

In any of the above technical solutions, preferably, the first heating device includes a first heating tube.

In any of the above technical solutions, preferably, the second heating device includes a second heating tube.

In this solution, the heating devices of the cooking appliance include heating tubes, so that the product has baking and heating functions.

In any of the above technical solutions, preferably, the first heating device includes at least one magnetron.

In this solution, the first heating device includes at least one magnetron, so that the product has a microwave heating function.

The additional aspects and advantages of the preset invention will be obvious in the following description or be understood by practice of the present invention.

BRIEF DESCRIPTION OF THE DRAWINGS

The above-mentioned and/or additional aspects and advantages of the preset invention will be obvious and easily understood from the description of embodiments in combination with the following drawings, in which.

Wherein, the corresponding relation between reference signs and part names in FIG. 1 is as follows.

1' base, 2' upper cover, 11' water retaining slope, 3' food.

Wherein, the corresponding relation between reference signs and part names in FIGS. 2-6 is as follows:
1 base, 10 back plate, 101 water retaining surface, 1011 installing hole, 11 carrier plate, 12 control panel, 13 bottom plate, 14 outer cover, 15 heating cavity, 151 first heating tube, 16 waveguide tube, 17 magnetron, 18 cooling fan, 19 exhaust tube, 2 upper cover, 20 accommodating groove, 201 heating plate, 21 vapor hole, 3 water storage trough, 30 tilting portion, 31 horizontal portion, 4 food.

DETAILED DESCRIPTION OF THE EMBODIMENTS

In order to more clearly understand the above-mentioned objects, features and advantages of the present invention, the present invention will be further described in detail below in combination with the accompanying drawings and specific embodiments. It should be noted that the embodiments of the present application and the features in the embodiments can be combined with each other without conflicts.

In the following description, numerous specific details are set forth in order to fully understand the present invention. However, the present invention can also be implemented in other ways different from that described herein. Therefore, the protection scope of the present invention is not limited to the specific embodiments disclosed below.

As shown in FIGS. 2-6, the embodiment of the present invention provides a cooking appliance, including a base 1 and an upper cover 2 articulated with the base 1; a housing of the base 1 is composed of a top plate at the top, a back plate 10 at the back, a control panel 12 in the front, a bottom plate 13 at the bottom and two outer covers 14 on left and right respectively, wherein a ceramic carrier plate 11 for placing food 4 is arranged on the top plate; the upper cover 2 is provided with an upward sunken accommodating groove 20 opposite to the carrier plate 11, and a vapor hole 21 is formed in the front of the accommodating groove 20; the back plate 10 is provided with a water retaining surface 101, the water retaining surface 101 is provided with an installing hole 1011, and a water storage trough 3 is detachably installed in the installing hole 1011; and when the upper cover 2 is opened, the water retaining surface 101 is located between the upper cover 2 and the base 1. A heating cavity 15 is formed below the carrier plate 11, a first heating tube 151 is installed in the heating cavity 15, two waveguide tubes 16 are welded to the bottom of the heating cavity 15, a magnetron 17 which is a cooling magnetron 17 is arranged at the tail end of each of the two waveguide tubes 16, a cooling fan 18 is installed in front of the magnetrons 17, an exhaust tube 19 is installed in back of the magnetrons 17, and the back plate 10 is provided with a heat dissipation hole opposite to the exhaust tube 19 in order to discharge hot air. A second heating tube is installed on the top wall of the accommodating groove 20 of the upper cover 2, and a heating plate 201 is installed below the second heating tube.

When the product is used for cooking, after food is put on the ceramic carrier plate 11, the upper cover 2 is closed to begin cooking, most of water vapor generated in the cooking appliance is discharged out of the product via the vapor hole 21, the remaining water vapor is left on the surface of the heating plate 201, and some food residue or soup simultaneously splashes onto the heating plate and the wall of the accommodating groove 20 during cooking. After cooking, when the upper cover 2 is opened, the residual water vapor is condensed, the condensed water mixed with food residue or soup flows down along the surface of the heating plate 201, flows to the water retaining surface 101 from the upper cover 2 and then flows into the water storage trough 3 along the water retaining surface 101, a user can detach the water storage trough 3 from the water retaining surface 101 for cleaning and put the water storage trough 3 back to the water retaining surface 101 after cleaning, and such design can reduce the cleaning difficulty of the product, so that the food residue or soup is cleaned thoroughly, and the cleanliness of the product is guaranteed to prevent the sanitation problem caused by the food residue or soup.

In this solution, the water storage trough 3, which is designed for collecting condensed water mixed with food residue or soup, is simple in structure and low in production cost. The water retaining surface 101 is provided with an installing hole 1011 matched with the water storage trough 3, so that the water storage trough 3 is convenient to detach and install, and based on this, some fixing structures may also be arranged between the water storage trough 3 and the installing hole 1011 to improve the fixing effect on the water storage trough 3, e.g., an elastic buckle is arranged on one of the water storage trough 3 and the installing hole 1011, and a matched clamping portion is arranged on the other one.

In the above embodiment, the water retaining surface 101 includes a diversion slope and a horizontal plane connected to the bottom of the diversion slope, the installing hole 1011 is located in the diversion slope and the horizontal plane, and the water storage trough 3 includes a tilting portion 30 matched with the diversion slope and a horizontal portion 31 matched with the horizontal plane.

Figure 6:
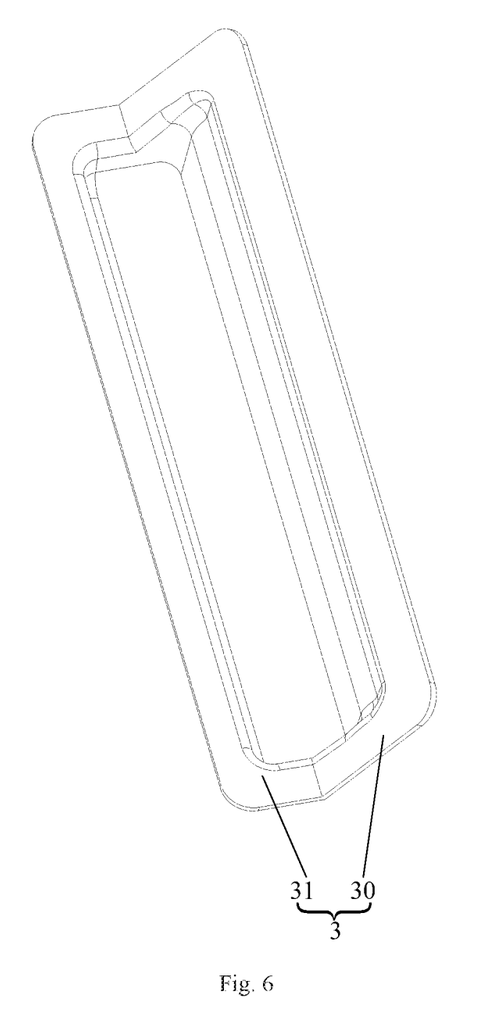
FIG. 6 is a structural schematic diagram of the water storage trough shown in FIG. 4.

In any of the above technical solutions, preferably, a turned edge extending outward is formed at the top of the water storage trough 3, and contacts the edge of the installing hole 1011, so that the water storage trough 3 is installed in the installing hole 1011.

In this solution, the turned edge is formed at the top of the water storage trough 3 and lapped with the edge of the installing hole 1011, and the detachment and installation of the water storage trough 3 in such assembly mode are simple and short in time, so that the user satisfaction can be improved.

In any of the above technical solutions, preferably, the edge of the installing hole 1011 is sunken down to form an installing groove matched with the turned edge.

When the water storage trough 3 is installed into the installing groove, the side wall of the turned edge contacts the side wall of the installing groove, so that the fixing effect on the water storage trough 3 can be improved.

In any above technical solution, preferably, the depth of the installing groove is greater than or equal to the thickness of the turned edge.

Such design ensures that after the water storage trough is installed into the installing groove, the turned edge is not higher than the outer edge of the installing groove, and the turned edge does not block condensed water, thus ensuring that the condensed water mixed with food residue or soup can completely flow into the water storage trough along the water retaining surface after flowing onto the water retaining surface.

In the description of the specification, it should be understood that the orientation or position relations indicated by terms "depth", "thickness", "upper", "lower", "front", "back", "left", "right", "top", "bottom", "inner", "outer" and the like are based on those shown in the accompanying drawings, are only used for facilitating the description of the present invention and simplifying the description, instead of indicating or implying that the indicated devices or elements must have specific orientations and be constructed and operated in the specific orientations, and thus cannot be understood as limiting the present invention.

In the description of the specification, the descriptions of the terms "one embodiment", "some embodiments", "specific embodiment" and the like mean that features, structures, materials or characteristics described in combination with the embodiments or examples are included in the at least one embodiment or example of the present invention. In the specification, the schematic expression of the terms may not indicate the same embodiments or examples. Besides, the described specific features, structures, materials or characteristics can be combined appropriately in any one or more embodiments or examples.

In the description of the present invention, the terms "first" and "second" are merely used for the purpose of description, but cannot be understood as indicating or implying relative importance, unless otherwise specified and defined; the terms "connected", "installed", "fixed" and the like should be broadly understood, e.g., "connected" may be fixedly connected, detachably connected, integrally connected, directly connected, or indirectly connected via an intermediary. Those of ordinary skill in the art can understand the specific meanings of the terms in the present invention according to specific circumstances.

Described above are merely preferred embodiments of the present invention, which are not used for limiting the present invention. Various modifications and changes can be made to the present invention for those skilled in the art. Any modification, equivalent substitution, improvement and the like made within the spirit and principle of the present invention shall fall into the protection scope of the present invention.

The invention claimed is:

1. A cooking appliance comprising
a base;
an upper cover configured to articulate with the base;
a liquid retaining surface; and
a liquid container,
wherein the liquid container is detachably installed at a position on the liquid retaining surface such that a liquid flowing gravitationally downwards from the upper cover in an open position relative to the base is guided by a section of the liquid retaining surface into the liquid container.

2. The cooking appliance of claim 1,
wherein the liquid container comprises a liquid storage trough,
wherein the liquid retaining surface is provided with an installing hole, and
wherein the liquid container is configured to be detachably installed in the installing hole of the liquid retaining surface.

3. The cooking appliance of claim 2,
wherein the liquid retaining surface comprises:
a diversion slope; and
a horizontal plane connected to a bottom of the diversion slope,
wherein the installing hole is located in the diversion slope and the horizontal plane, and
wherein the liquid storage trough comprises:
a tilting portion matched with the diversion slope; and
a horizontal portion matched with the horizontal plane.

4. The cooking appliance of claim 2,
wherein the liquid storage trough comprises a turned edge, wherein the turned edge extends outward from the liquid storage trough, is formed at the top of the liquid storage trough, and contacts the edge of the installing hole, so that the liquid storage trough is detachably installed in the installing hole.

5. The cooking appliance of claim 4,
wherein a portion of the liquid retaining surface adjacent to the edge of the installing hole is sunken downwards to form an installing groove matched with the turned edge.

6. The cooking appliance of claim 5,
wherein the depth of the installing groove is greater than or equal to the thickness of the turned edge.

7. The cooking appliance of claim 1, comprising:
a carrier plate for placing food, wherein the carrier plate is arranged on the base,
a first heating device installed below the carrier plate,
wherein the upper cover is provided with an upward sunken accommodating groove opposite to the carrier plate.

8. The cooking appliance of claim 7, comprising:
a second heating device arranged on a wall of the accommodating groove.

9. The cooking appliance of claim 8,
wherein the first heating device comprises a first heating tube, and
wherein the second heating device comprises a second heating tube.

10. The cooking appliance of claim 9,
wherein the first heating device comprises at least one magnetron.

11. The cooking appliance of claim 2, further comprising:
a carrier plate for placing food, wherein the carrier plate is arranged on the base; and
a first heating device installed below the carrier plate,
wherein the upper cover is provided with an upward sunken accommodating groove opposite to the carrier plate.

12. The cooking appliance of claim 3, further comprising:
a carrier plate for placing food, wherein the carrier plate is arranged on the base; and
a first heating device installed below the carrier plate,
wherein the upper cover is provided with an upward sunken accommodating groove opposite to the carrier plate.

13. The cooking appliance of claim 4, further comprising:
a carrier plate for placing food, wherein the carrier plate is arranged on the base; and
a first heating device installed below the carrier plate,
wherein the upper cover is provided with an upward sunken accommodating groove opposite to the carrier plate.

14. The cooking appliance of claim 5, further comprising:
a carrier plate for placing food, wherein the carrier plate is arranged on the base; and
a first heating device installed below the carrier plate,
wherein the upper cover is provided with an upward sunken accommodating groove opposite to the carrier plate.

15. The cooking appliance of claim 6, further comprising:
a carrier plate for placing food, wherein the carrier plate is arranged on the base; and
a first heating device installed below the carrier plate,
wherein the upper cover is provided with an upward sunken accommodating groove opposite to the carrier plate.

* * * * *